(12) United States Patent
Conti

(10) Patent No.: US 10,501,057 B2
(45) Date of Patent: Dec. 10, 2019

(54) PARKING LOCK PRE-SELECTION SYSTEM

(71) Applicant: CNH Industrial America LLC, New Holland, PA (US)

(72) Inventor: Enrico Conti, Brescia (IT)

(73) Assignee: CNH Industrial America LLC, New Holland, PA (US)

( * ) Notice: Subject to any disclaimer, the term of this patent is extended or adjusted under 35 U.S.C. 154(b) by 216 days.

(21) Appl. No.: 15/542,342

(22) PCT Filed: Jan. 6, 2016

(86) PCT No.: PCT/EP2016/050127
§ 371 (c)(1),
(2) Date: Jul. 7, 2017

(87) PCT Pub. No.: WO2016/110507
PCT Pub. Date: Jul. 14, 2016

(65) Prior Publication Data
US 2018/0273002 A1    Sep. 27, 2018

(30) Foreign Application Priority Data
Jan. 7, 2015  (IT) .............................. MO2015A0001

(51) Int. Cl.
| | | |
|---|---|---|
| *B60T 1/00* | (2006.01) | |
| *F16D 63/00* | (2006.01) | |
| *F16H 63/34* | (2006.01) | |
| *F16H 51/00* | (2006.01) | |
| *F16D 121/14* | (2012.01) | |

(52) U.S. Cl.
CPC ............ *B60T 1/005* (2013.01); *F16D 63/006* (2013.01); *F16H 63/34* (2013.01); *F16D 2121/14* (2013.01); *F16H 51/00* (2013.01); *F16H 63/3433* (2013.01)

(58) Field of Classification Search
CPC .... B60T 1/005; F16D 63/006; F16D 2121/14; F16H 63/34; F16H 63/3433; F16H 51/00
See application file for complete search history.

(56) References Cited

U.S. PATENT DOCUMENTS

| | | | |
|---|---|---|---|
| 2,964,135 A | * | 12/1960 | Sand ....................... B60T 1/005 188/69 |
| 3,710,904 A | * | 1/1973 | Boyer ..................... F16H 61/22 180/336 |
| 3,856,119 A | * | 12/1974 | Harrington ............. B60T 1/005 188/69 |
| 4,369,867 A | | 1/1983 | Lemieux |
| 4,585,103 A | | 4/1986 | Kuwayama et al. |

(Continued)

OTHER PUBLICATIONS

Search Report and Opinion for PCT Application No. PCT/EP2016/050127 dated Jun. 7, 2016 (9 pages).

*Primary Examiner* — David R Morris
(74) *Attorney, Agent, or Firm* — Rickard K. DeMille; Rebecca L. Henkel

(57) ABSTRACT

A parking lock pre-selection mechanism for a work machine is disclosed in which a pawl is engageable with teeth on a power train output shaft to lock it in place. An operator lever is used to preselect the parking lock position. The mechanism includes first and second pivotally interconnected links, urged by a spring to a maximum length set by a stop. The spring causes the pawl to be urged into place when the teeth and pawl are in proper alignment.

9 Claims, 3 Drawing Sheets

(56) References Cited

U.S. PATENT DOCUMENTS

| | | | |
|---|---|---|---|
| 6,250,433 B1 | 6/2001 | Sealine et al. | |
| 8,240,448 B2* | 8/2012 | Hongawara | B60T 1/005 188/31 |
| 9,440,625 B2* | 9/2016 | Marklen | B60T 1/005 |
| 10,161,519 B2* | 12/2018 | Hamaya | F16H 63/3466 |
| 2011/0005891 A1* | 1/2011 | Hongawara | B60T 1/005 192/219.4 |
| 2015/0027846 A1* | 1/2015 | Marklen | B60T 1/005 192/219.6 |
| 2016/0208916 A1* | 7/2016 | Kokubu | B60T 1/005 |
| 2017/0292605 A1* | 10/2017 | Hamaya | F16H 63/3466 |
| 2019/0049005 A1* | 2/2019 | Clark | F16H 63/3425 |

* cited by examiner

PARKING LOCK PRE-SELECTION SYSTEM

CROSS REFERENCE TO RELATED APPLICATIONS

This application is a US National Stage filing of International Application Serial No. PCT/EP2016/050127 entitled "PARKING LOCK PRE-SELECTION SYSTEM," filed Jan. 6, 2016, which claims priority to Italian Application Serial No. MO2015A000001, filed Jan. 7, 2015, each of which is incorporated by reference herein in its entirety for all purposes.

BACKGROUND OF THE INVENTION

The present invention relates to work machine power trains, and more specifically to parking lock systems for such power trains.

In the field of work machines, the power train plays an important role in propelling the work machine at appropriate speeds and providing sufficient torque for work machine movement and additional power requirements such as agricultural processing. An important feature of the work machine power train is to have a parking lock which positively locks the power train, and hence the work machine, in place. Typically, this is done by utilizing teeth on one of the power train output shafts and a parking pawl that is moveable into engagement with the teeth to positively lock the work machine in place. U.S. Pat. No. 6,250,433 discloses a positive locking parking brake where the brake/lock pin is preferably spring biased towards its extended position, with its spring acting direct on the pin.

The parking lock pawl is equipped with safety features to prevent engagement while a work machine is moving. In addition, the parking feature is operator actuated by moving an operator lever into a fixed parking lock position. With a solid link in the mechanism between the operator lever and the parking lock pawl, if the alignment of the shaft is such that the pawl engages the top of a tooth, the operator must move the work machine so that the tooth rotates out of interference with the pawl and permit engagement. This adds additional complexity to the procedure for parking the work machine, since the operator must continue to exert force on the lever engaging the parking lock mechanism.

It has been proposed to alleviate this condition by incorporating a telescoping spring loaded link within the actuation system for the parking lock. This approach, however, presents a problem when incorporated in the agricultural work machine environment with external contaminants and widely varying conditions. The clearances in a telescoping link are stringent and can be prone to sticking or other interference. In addition, the telescoping link can be misaligned when the work machine is on a hill, in which case the weight of the work machine is translated into force against the link.

What is needed in the art therefore, is a simplified and robust pre-selection mechanism for the parking lock system of a work machine power train.

SUMMARY OF THE INVENTION

The present invention provides a pre-selection parking lock feature that is reliable and simplified.

In one form, the invention is embodied in an operator initiated parking lock actuation system for a work machine in which the parking lock is actuated by displacement of a lever. The system includes a first link and a second link pivotally connected to the first link at a point in between the ends of the first and second links, with one end of each link being connected between an operator displacement input and the parking lock lever. A spring is interconnected between the first and second link to yieldably urge them to an elongated state and a stop on one of the links limits the elongated state to a length causing displacement of the lever to initiate engagement of the parking lock.

In another form, the invention is a power train for a work machine including a rotatable output shaft having teeth on it and a pawl displaceable into and out of engagement with the teeth to lock the power train. The pawl is connected to a lever that responds to an operator input. The system includes a first link and a second link pivotally connected to the first link at a point in between the ends of the first and second links, with one end of each link being connected between an operator displacement input and the lever for the parking lock. A spring is interconnected between the first and second links to yieldably urge them to an elongated state and a stop on one of the links limits the elongated state to a length that causes the parking lock lever to displace the pawl into engagement with the teeth.

An advantage of the present invention is a simplified construction for a parking lock pre-selection mechanism.

Another advantage is less sensitivity to contaminates in the environment.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
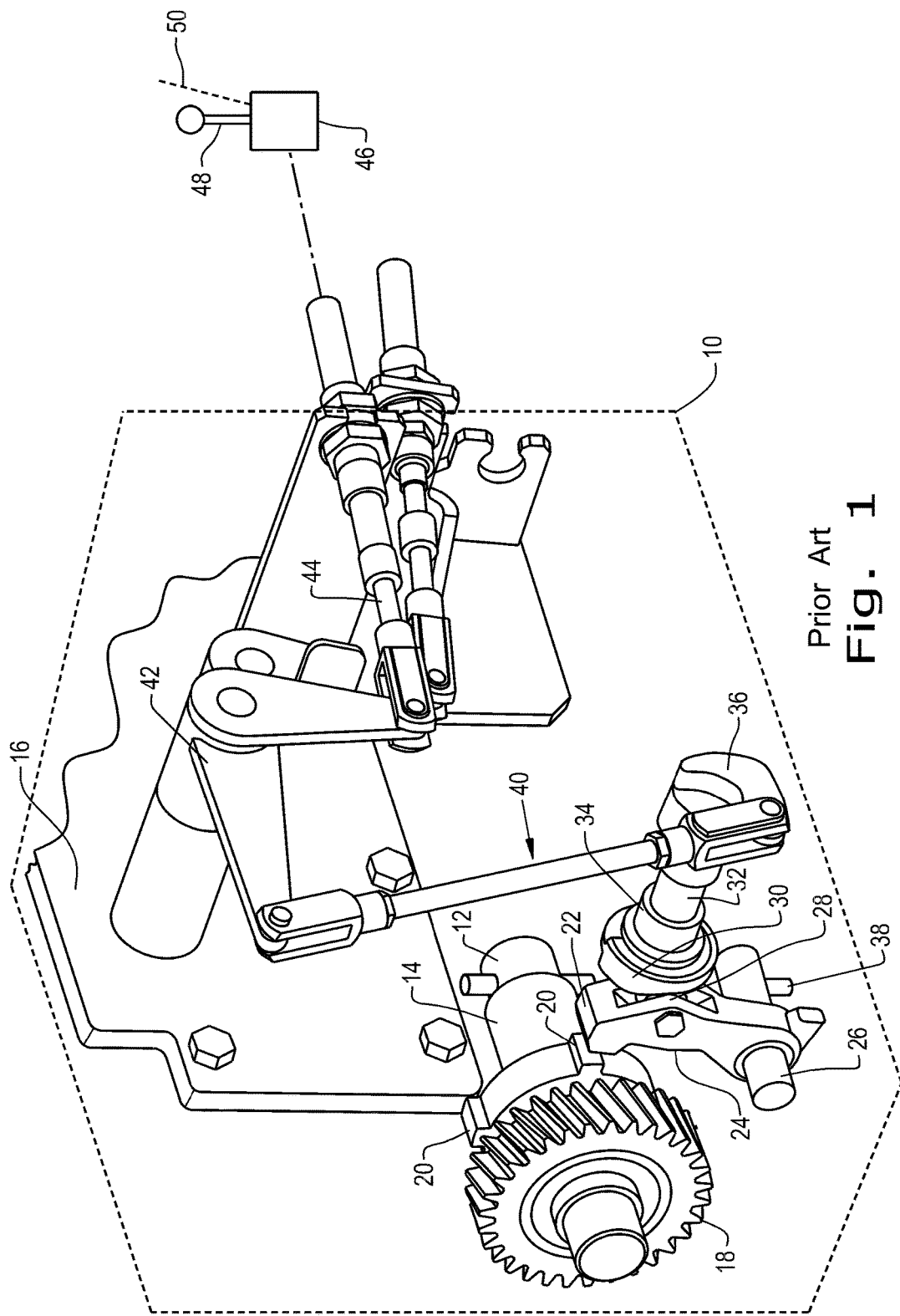
FIG. 1 shows the power train of a work machine partially in schematic form and showing a parking lock function as shown in the prior art.

Referring to FIG. 1, there is shown a power train 10, partially illustrated in schematic form. Power train 10 is typically utilized in a work machine (not shown) to provide forward motion for the work machine and also to connect the output of the work machine power unit to agricultural processing equipment. The power train 10 may include gear change sets, differentials, clutches, and other mechanical devices to match the RPM of the power unit to the necessary velocity or torque output. The power train 10 includes an output shaft 12 journaled at 14 within housing 16, only a portion of which is shown. The shaft 12 may have a gear 18 providing engagement with the additional components of the drive train 10. The shaft 12 has a plurality of teeth 20 extending radially outward at selected locations around its periphery. A pawl 22 is mounted on a rocker arm 24, which in turn, is pivotally mounted at 26 and is displaceable to position pawl 22 so that it interferes with and locks the shaft 12 in place by virtue of the teeth 20. A roller follower 28 on rocker arm 24 interacts with a cam 30 on a cam support shaft 32 that is journaled at 34. The cam 30 has a surface contour in the form of a ramp so that rotation of the cam support shaft 32 in a counter-clockwise direction, as shown in FIG. 1, urges rocker arm 24 and pawl 22 into engagement with teeth 20 on shaft 12. The end of cam support shaft 32 has a cam support shaft lever 36 to receive a displacement input. A spring 38 acts on rocker arm 24 to yieldably urge roller follower 28 against cam 30. A control link 40 formed from a solid rod is pivotally connected to a crank arm 42 which is in turn connected to an actuating cable 44. Actuating cable 44 extends to an operator selection mechanism 46 which incorporates an operator lever 48 for moving the desired condition between the illustrated position in which the parking lock is disengaged and a position 50 in which the parking lock is engaged.

As discussed above, the solid link 40 presents difficulties in engagement when the position of shaft 12 is such that a tooth 20 abuts the pawl 22. In accordance with the present invention, the control link assembly 52 illustrated in FIG. 2 is employed to overcome these deficiencies.

Figure 3:
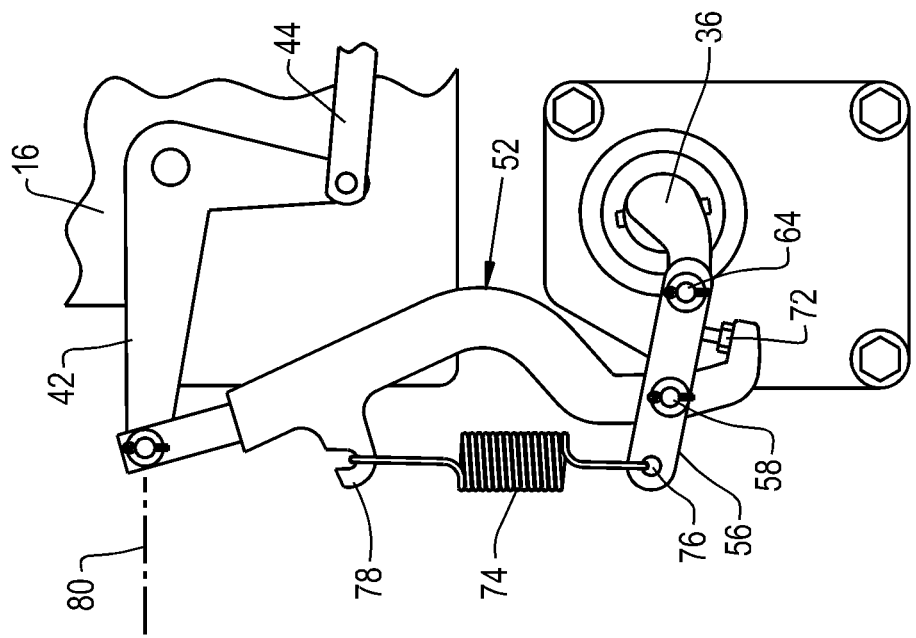
FIG. 3 shows the power train of FIG. 1 incorporating the pre-selection mechanism of FIG. 2 in a state where the parking lock is not engaged.
Figure 2:
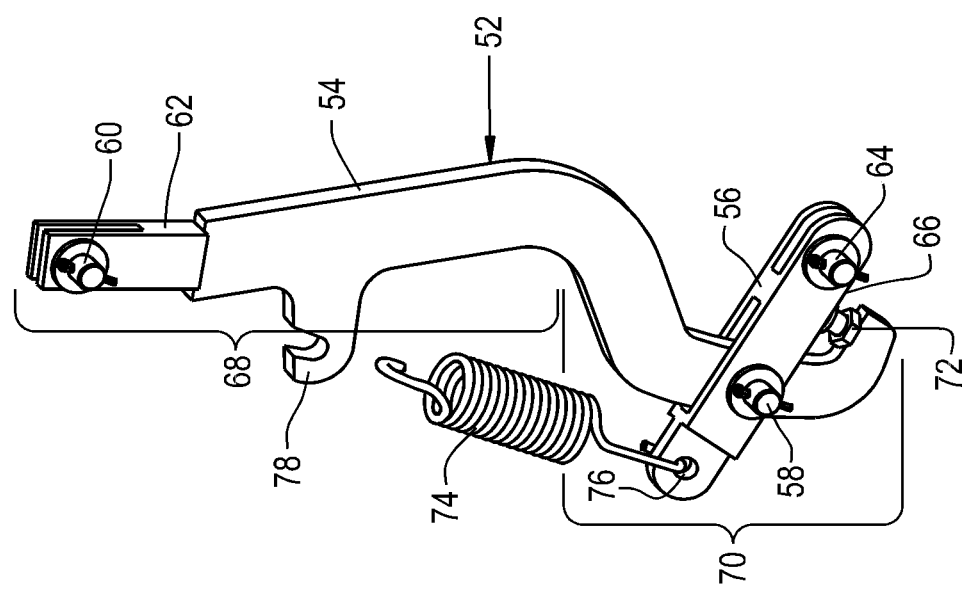
FIG. 2 is a side view of a parking lock pre-selection mechanism embodying the present invention.

Referring specifically to FIG. 2, an improved control link assembly 52 includes a first link 54 pivotally connected to a second link 56 at a pin 58 which forms a pivot between the two. As illustrated, the junction between the first and second links is in between their ends. One end of link 54 has a forked section 62 through which a pin 60 connects the control link assembly 52 to the bell crank 42 as shown in FIG. 3. A pin 64 extends through a forked section 62 of link 56 to provide a connection to the cam support shaft lever 36. Thus, links 54 and 56 interconnect the crank arm 42 and cam support shaft lever 36. Link 54 has a generally straight section 68 and a curved section 76 so that the pin 64 on the forked section 66 generally is in alignment with the straight section 68. An adjustable stop 72 on one end of link 56 sets the maximum distance between pins 64 and 60 and thus the overall length of the control link assembly 52. As illustrated, the adjustable stop 72 is a threaded screw with an appropriate lock nut to set the adjusted position. A spring 74 connects with a hole 76 in link 56 and with a tab with a notch 78 on the first link to urge the links 56 and 54 to a relative position in which they are in the maximum length position as set by stop 72.

Figure 4:
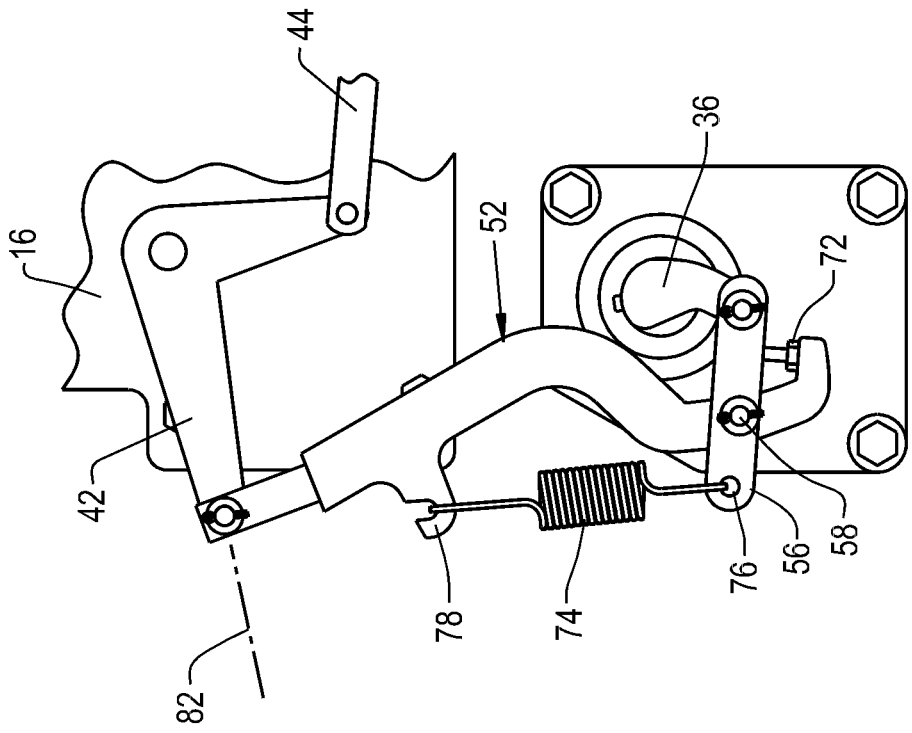
FIG. 4 shows the pre-selection mechanism of FIG. 2 in a pre-selected state.
Figure 5:
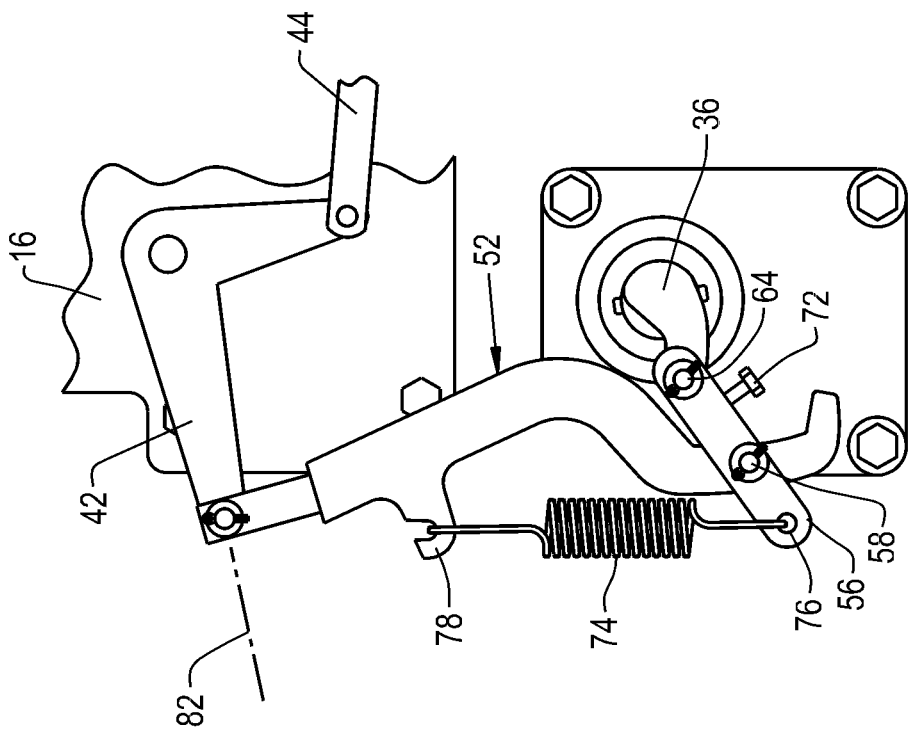
FIG. 5 shows the pre-selection mechanism of FIGS. 2 and 3 in the position for parking lock engagement.

The operation of the control link assembly 52 can be explained by reference to FIGS. 3-5. In FIG. 3, the operator lever 48 of FIG. 1 is in a non-parking lock position and the crank arm 42 assumes the position shown by reference line 80. At this point, the pawl 22 is clear of the teeth 20 and the power train 10 can function in a normal fashion. When it is desired to select the parking lock position, lever 48 is moved to the parking lock position shown by line 50, which pulls crank arm 42 downward to the pre-selection position illustrated by reference line 82 in FIG. 4. If the pawl 22 is in line with a tooth 20, the spring 74 permits the links 54 and 56 to pivot relative to one another that the displacement of the first link 54 is not reflected in movement of the cam support shaft lever 36. In this position, the operator has already locked the selection lever 48 in position 50 so that no further active manipulation need take place. As the work machine moves slightly by gravity and clearances within the power train, the shaft 12 can rotate so that the pawl 22 is clear of a tooth 20. In that case, the spring 74 pulls to urge the links 54 and 56 to their maximum position set by the adjustable stop 72 to pivot crank cam support shaft lever 36 to the position shown in FIG. 5 in which the cam surface 30 moves to urge the pawl 22 into the space between adjacent teeth 20. In this position, the pawl 22 and teeth 20 provide an effective lock against movement of the work machine. The strength of the spring 74 is selected so that when a pawl 22 is clear of a tooth 20 the spring will overcome any frictional forces within the system.

The above arrangement provides a highly effective and simplified parking lock pre-selection system for the power train of a work machine. The joints are pivoting rather than sliding joints so as to minimize the frictional interconnection. The links 54 and 56 can be formed from inexpensive stampings and easily connected with the pins in the parking lock control mechanism, thus reducing the cost of manufacture. With such an arrangement, the operator need not continually press on the operator lever 48 to allow the pawl 22 to move into engagement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An operator controlled parking lock actuation system for a work machine in which a parking lock mechanism is engaged by displacement of a lever, the system comprising:
   a first link having a first end connected to an operator selection mechanism;
   a second link pivotally connected to the first link at a point in between the ends of the first and second links, the second link having a first end connected to the lever of the parking lock mechanism;
   a spring interconnected between the first and second links to yieldably urge the first and second links to an elongated state; and
   an adjustable stop on one of the first and second links to limit the elongated state to a length causing displacement of the lever and engagement of the parking lock mechanism, wherein the adjustable stop is a screw threaded into one of the first and second links and abutting the other of the first and second links.

2. The parking lock actuation system as claimed in claim 1, wherein the spring has a sufficient spring force to overcome system friction forces to engage the parking lock mechanism.

3. The parking lock actuation system as claimed in claim 1, wherein the first link is longer than the second link.

4. The parking lock actuation system as claimed in claim 3, wherein the first link has a straight section and an integral curved section, the second link being pivotally mounted to the first link in the curved section so that the first end of the second link connecting to the parking lock mechanism is generally in line with the straight section.

5. A power train, comprising:
   a rotatable output shaft having a plurality of teeth around its periphery;
   a pawl displaceable into and out of a space between the teeth on the shaft to engage one of the teeth;

a rocker arm pivotally mounted to displace the pawl into and out of engagement by pivoting;

a mechanism for translating displacement into rotation of the rocker arm;

an operator selection mechanism including a fixed position for a parking lock selection and including a crank arm;

a first link having a first end;

a second link pivotally connected to the first link at a point in between the ends of the first and second links, the second link having a first end;

a spring interconnected between the first and second links to yieldably urge the first and second links to an elongated state; and the first end of each of the first and second links being connected to the rocker arm displacement mechanism and to the crank arm of the operator selection mechanism;

whereby the operator selection mechanism is operable to be moved to the parking lock position and, if the pawl interferes with the teeth, is urged to engagement when the output shaft is rotated to clear the teeth;

an adjustable stop on one of the first and second links operable to limit the elongated state to a length causing displacement of the lever and engagement of the pawl, wherein the adjustable stop is a screw threaded into one of the first and second links and abutting the other of the first and second links.

6. The power train as claimed in claim 5, wherein the rocker arm displacement mechanism for the pawl comprises a cam surface mounted on a rotatable cam support shaft and having a contour that rotation of the cam surface urges the pawl into engagement and the cam surface is actuated by a lever to which one of the first ends of the first and second links is connected.

7. The power train as claimed in claim 5, wherein the spring has a sufficient spring force to overcome system friction forces to engage the pawl.

8. The power train as claimed in claim 5, wherein the first link is longer than the second link.

9. The power train as claimed in claim 8, wherein the first link has a straight section and an integral curved section, the second link being pivotally mounted to the first link in the curved section so that its end connecting to the rocker arm displacement mechanism is generally in line with the straight section.

\* \* \* \* \*